United States Patent
Kim et al.

(10) Patent No.: US 7,389,467 B2
(45) Date of Patent: Jun. 17, 2008

(54) METHOD OF ERROR CORRECTION CODING, AND APPARATUS FOR AND METHOD OF RECORDING DATA USING THE CODING METHOD

(75) Inventors: Ki-hyun Kim, Seongnam-si (KR); Yoon-woo Lee, Gyeonggi-do (KR); Sung-hee Hwang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 566 days.

(21) Appl. No.: 10/848,563

(22) Filed: May 19, 2004

(65) Prior Publication Data
US 2005/0015698 A1 Jan. 20, 2005

(30) Foreign Application Priority Data
May 20, 2003 (KR) .................. 10-2003-0032093
Jul. 8, 2003 (KR) .................. 10-2003-0046127

(51) Int. Cl.
*G11C 29/00* (2006.01)

(52) U.S. Cl. .................. 714/763; 714/762; 714/784; 714/701; 714/788

(58) Field of Classification Search ................ 714/784, 714/762, 701
See application file for complete search history.

(56) References Cited

U.S. PATENT DOCUMENTS

| 6,367,049 B1 | 4/2002 | Van Dijk et al. |
| 6,810,198 B1 * | 10/2004 | Kuroda et al. ................ 386/46 |
| 2004/0098661 A1 * | 5/2004 | Chuang et al. ............. 714/784 |

OTHER PUBLICATIONS

U.S. Appl. No. 10/847,676, filed May 18, 2004, Kim et al., Samsung Electronics Co., Ltd.
U.S. Appl. No. 10/846,913, filed May 17, 2004, Kim et al., Samsung Electronics Co., Ltd.

* cited by examiner

*Primary Examiner*—Guy J. Lamarre
(74) *Attorney, Agent, or Firm*—Stein, McEwen & Bui, LLP

(57) ABSTRACT

A method of recording data includes forming a plurality of codewords by error correction coding a predetermined amount of inputted data according to a predetermined method, and recording the data including the plurality of codewords to the small-sized optical disc in a recording unit of a shorter length than a predetermined track of an inner circumference region of the small-sized optical disc.

12 Claims, 6 Drawing Sheets

METHOD OF ERROR CORRECTION CODING, AND APPARATUS FOR AND METHOD OF RECORDING DATA USING THE CODING METHOD

CROSS-REFERENCE TO RELATED APPLICATIONS

This application claims the benefit of Korean Patent Application No. 2003-32093, filed on May 20, 2003, and No. 2003-46127 filed on Jul. 8, 2003, in the Korean Intellectual Property Office, the disclosure of which is incorporated herein by reference.

BACKGROUND OF THE INVENTION

1. Field of the Invention

The present invention relates to a method of error correction coding, and a method and apparatus for recording data using the same.

2. Description of the Related Art

Information recording media include magnetic discs such as floppy discs and hard discs, magnetic tapes, semiconductor memory chips such as ROMs and RAMs, and optical discs such as CDs and DVDs.

The recording capacity of an optical disc has rapidly increased along with the development of semiconductor techniques and signal processing techniques, and the price of optical discs is relatively low.

Information recorded on an optical disc is recorded in block units with a predetermined size. The block unit in which data is recorded is also a basic unit for error correction coding (ECC). A size of an ECC block used in a conventional optical disc is generally 32 Kbytes or 64 Kbytes.

Attempts have been made to use the optical disc as an information recording medium for recording and/or reproducing both sound and images simultaneously with a portable electronic device such as a camcorder.

However, the use of the optical disc in such a portable electronic device like a camcorder has a few shortcomings. That is, the size of the optical disc, generally 80 mm or 120 mm, is too big for a camcorder, and power consumption is too high using the conventionally sized optical disc.

Accordingly, to use the optical disc as an information recording medium for a portable electronic device, an optical disc with a smaller size, but higher recording density, than a conventional optical disc is required.

When recording and reproducing data with a conventional size of an ECC block unit on a small-sized optical disc having a diameter of 30-50 mm, a problem may occur in correcting errors when reproducing recorded data.

For error correction coding in a conventional DVD, a Reed-Solomon Production Code (RSPC) is used. In the case of the RSPC, an ECC block unit includes 416 recording frames corresponding to 32 Kbytes of user data. One sync frame includes 1488 channel bits, and one channel bit is 0.133 μm long. Therefore, the length of the unit ECC block in a track direction is 82,328.064 μm, which is equivalent to a circumference of a circle with a radius of 13.1 mm. Accordingly, when the ECC block unit used in the conventional DVD is recorded within a region inside the radius of 13.1 mm, the ECC block unit will occupy more than one track. Therefore, when recording a conventional ECC block unit to a small-sized optical disc having a diameter of 30-50 mm, it is inevitable to record the error correction data on two or more tracks.

FIG. 1 is a schematic drawing showing an inner circumference region of a small-sized optical disc, on which data with a conventional ECC block unit is recorded.

Referring to FIG. 1, when a 64 Kbytes ECC block unit is recorded from an inner circumference region to an outer circumference region in the data recording region within a radius of 6 mm from the center of a small-sized optical disc, the conventional ECC block unit is recorded in the regions from point A to point D. That is, when recording the ECC block unit from the innermost circumference region of the small-sized optical disc, the ECC block unit is recorded on two tracks, thereby generating an overlapping region in a radial direction by the ECC block unit. If there is a scratch in a radial direction on an overlapping region on which the unit ECC block is recorded, a serious error may occur in the ECC block unit, thereby reducing an error correction capability remarkably.

That is, if an ECC block unit is not recorded in only one track, but recorded in two tracks of a small-sized optical disc, the error correction capability of the recorded ECC block unit is remarkably reduced if there is any defect such as a scratch on the inner circumference region.

This problem occurs not only when the RSPC is used as an ECC format, but also occurs when a long distance code (LDC) is used.

According to U.S. Pat. No. 6,367,049, an ECC block unit includes 304 LDCs generated according to RS (248, 216, 33), and 24 burst indicator subcodes (BIS) generated according to RS (62, 32, 33). An ECC block unit includes 64 Kbytes of user data and 496 recording frames. Each recording frame includes a Sync pattern, 152 bytes of ECC data, and 3 bytes of BIS.

When 8 bytes are modulated to 12 bytes according to a modulation method of Run Length Limit (RLL) (1, 7), and if the number of Sync patterns is 20, the length occupied by the ECC block according to the Channel Bit Length (CBL) and ECC format in a track direction is 937,440×CBL.

A length of an ECC block disclosed in U.S. Pat. No. 6,367,049 is equal to a length of the circumference of a circle with a radius of 149,274×CBL. Since error correction corresponding to a length of 64 recording frames is possible according to the ECC format, the maximum error correction length is 120,960×CBL.

Therefore, when the CBL is 0.100 μm, a radius of a circle having a circumference equal to the length of the ECC block is 14.93 mm, and the maximum error correction length is about 12.10 mm.

When the CBL is 0.090 μm, a radius of a circle having a circumference equal to the length of the ECC block is 13.43 mm, and the maximum error correction length is about 10.89 mm.

When the CBL is 0.080 μm, a radius of a circle having a circumference equal to the length of the ECC block is 11.94 mm, and the maximum error correction length is about 9.68 mm.

When the CBL is 0.070 μm, a radius of a circle having a circumference equal to the length of the ECC block is 10.45 mm, and the maximum error correction length is about 8.47 mm.

When the CBL is 0.060 μm, a radius of a circle having a circumference equal to the length of the ECC block is 8.96 mm, and the maximum error correction length is about 7.26 mm.

Practically, an optical disc having a diameter of 120 mm does not have an overlapping region for these ECC blocks because the recording commences beyond a radius of 20 mm. However for a small-sized optical disc having a diameter of 30~50 mm, the radius to commence recording data has to be small to record as much data as possible.

In the case of applying the ECC format of 64 Kbytes disclosed in U.S. Pat. No. 6,367,049 to a small-sized disc in which the recording or storing data commences from a radius of about 6~9 mm, and when the CBL is larger than 0.060 μm, inevitably the ECC block unit is recorded to two or more tracks.

If the CBL is 0.070 μm, and one recording frame includes 1890 channel bits, a length occupied by the recording frame is 132.3 μm. Accordingly, a 2 mm scratch can affect about 16 consecutive recording frames. In this case, an error of 8 bytes is caused to the RS (248, 216, 33) code, and an error of 16 bytes will be caused when the scratch occurs on an overlapping region on which an ECC block unit is recorded to two tracks.

Assuming that an erase correction is performed on the scratched region and a Byte Error Rate is $10^{-3}$, the block error rates (BER) when an 8 bytes error and a 16 bytes error occur in an ECC block unit are shown in Table 1.

TABLE 1

| | 8 bytes of error | 16 bytes of error |
|---|---|---|
| BER when a scratch is 1 mm | $7.8 * 10^{-20}$ | $2.5 * 10^{-16}$ |
| BER when a scratch is 2 mm | $2.5 * 10^{-16}$ | $1.1 * 10^{-9}$ |

Referring to Table 1, the BER when a scratch occurs on a region in which an ECC block unit is overlapping on two tracks is more than double that of an error when a scratch of the same length occurs on a region in which an ECC block unit is in one track.

A length L of the ECC block unit occupying a length of recording medium in the track direction is a multiple of channel bit numbers CBN of the ECC block, a minimum mark length MML according to a numerical aperture and laser wavelength, and a channel bit length CBL defined by a modulation code. That is, L=CBN×MML×CBL.

At the same modulation code, by increasing the density of recording lines (reducing minimum mark length), and by decreasing the length of the channel bit, the length of the ECC block can be reduced, thereby minimizing or removing a region overlapping two or more tracks by an ECC block unit.

However, an effect of an error causing problem such as a scratch or a finger print is increased in an inversely proportional manner to the reduction of the channel bit length. Consequentially, the effect of an error increases with the reduction of the channel bit length, even though the size of the error causing problem does not change. That is, if the length of the channel bit is reduced, the length of the maximum error correction of the ECC block is also reduced. Therefore, the reduction of the length of channel bit as a way of recovering the error correction capability of the ECC block on an overlapping region accompanies a problem of reducing the maximum error correction length of the ECC block.

Therefore, in a case when reducing the size of the ECC block at a fixed channel bit length (the minimum mark length is equal to the modulation code) and at the same parity ratio, the maximum error correction length may also be reduced. The maximum error correction length under a structure of the ECC format proposed in U.S. Pat. No. 6,367,049 is determined by adding parity of a codeword existing in the ECC block unit to an interleaving depth between codewords. That is, the maximum error correction bytes are 9728 because the ECC format is RS (248, 216, 33) code x 304.

Consequentially, since the size reduction of the ECC block maintaining the parity ratio results in the reduction of an interleaving depth or the reduction of an amount of user data, and adding parity of a codeword, the maximum error correction bytes will be reduced. Accordingly, the reduction of an error correction capability, including a maximum error correction length, will appear.

As described above, when a circumference on a region of the optical disc to which the ECC block is recorded or stored is shorter than the length of the unit ECC block, the unit ECC block is recorded to two or more tracks, thereby reducing the error correction capability, which results in lowering the reproducing reliability.

A conventional optical disc has a structure of recording regions in which a lead-in region, a user data region, and a lead-out region are sequentially formed from an inner circumference region to an outer circumference region. Generally, important information for reproducing data of the optical disc is recorded to the inner circumference region corresponding to the lead-in region.

Therefore, the reduction of error correction capability of the ECC block unit recorded in the inner circumference region becomes a serious problem.

SUMMARY OF THE INVENTION

The present invention provides a method of error correction coding to prevent a ECC block unit from being recorded to two or more tracks of a small-sized optical disc and improving an error correction capability.

The present invention also provides an apparatus to record, and a method of recording, data using the coding method.

Additional aspects and/or advantages of the invention will be set forth in part in the description which follows and, in part, will be obvious from the description, or may be learned by practice of the invention.

According to an aspect of the present invention, there is provided a method of error correction coding comprising generating an LDC block of (184,152,32,216) with 32 Kbytes of user data, generating a BIS block to indicate a location of an occurred error group, and generating an ECC block by combining a predetermined amount of the BIS block data and the LDC block, wherein different portions of the BIS block are separated at a predetermined distance by one or more portions of the LDC block.

According to another aspect of the present invention, there is provided a data recording apparatus comprising an optical head, a codec to generate a plurality of codewords by error correction coding a predetermined amount of the data according to a predetermined method, and a control unit to control the optical head to record data including the plurality of codewords in a recording unit of a shorter length than a predetermined track in an inner circumference region of a small-sized optical disc.

The codec may perform error correction coding according to a Reed-Solomon coding method in which parity bytes P are added to input data bytes D, and may perform error correction coding according to a determined parity ratio P/(D+P) to supplement a reduction of error correction capability caused by the short length of the recording unit.

The parity ratio may be determined by reducing the input data bytes D and increasing the parity bytes P.

According to an embodiment of the present invention, there is provided a method of recording data to a small-sized optical disc, comprising: forming a plurality of codewords by error correction coding of a predetermined amount of the data to a predetermined method, and recording the data including the plurality of codewords to the small-sized optical disc in a recording unit of a shorter length than a predetermined track of an inner circumference region of the small-sized optical disc.

The error correction coding may be performed according to a Reed-Solomon coding method in which parity bytes P are added to input data bytes D.

The forming of the plurality of codewords by error correction coding may further include determining a parity ratio P/(D+P) to supplement a reduction of error correction capability caused by the short length of the recording unit.

The forming of a plurality of codewords by error correction coding method may improve the parity ratio by reducing the input data bytes D and increasing the parity bytes P.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
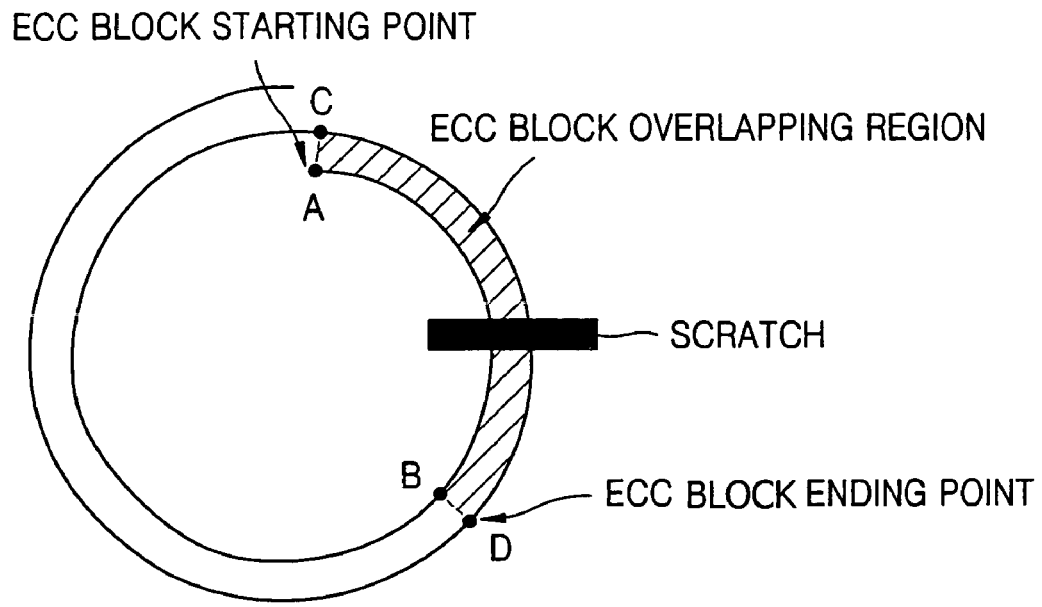
FIG. 1 is a schematic drawing of an inner circumference region of a small-sized optical disc to which data is recorded with a conventional ECC block unit.

Reference will now be made in detail to the embodiments of the present invention, examples of which are illustrated in the accompanying drawings, wherein like reference numerals refer to the like elements throughout. The embodiments are described below to explain the present invention by referring to the figures.

As described above, when recording data to a small-sized optical disc having a diameter of about 30~50 mm, in which a Channel Bit Length (CBL) is between 0.060 and 0.133 μm and the starting radius of data recording is 6 mm~9 mm, according to the ECC format with 64K bytes of user data disclosed in U.S. Pat. No. 6,367,049, there inevitably exists an overlapping region of ECC blocks in the radial direction.

In the present invention the user data size within the ECC block is reduced to 32 Kbytes in order to avoid overlapping of the ECC blocks in the radial direction. Also, the parity ratio of the data is increased to supplement the reduced error correction capability. The parity ratio of the data is expressed as in the following formula.

$$\text{Parity ratio} = P/(D+P) \quad \text{Formula 1}$$

In Formula 1, D represents the byte size of the user data and P represents the byte size of the parity.

Given that the possible Channel Bit Length (CBL) is 0.060 μm by the current modulation code and optical characteristics such as numerical aperture and laser wavelength, if the 64 Kbytes ECC format disclosed in U.S. Pat. No. 6,367,049 is modified to a 32 Kbytes ECC format maintaining parity ratio of RS (248,216,33) code X 152 or RS (124,108,17) code X 304 at the identical recording frame, the 32 Kbytes sized ECC block has the same length as the circumference of a circle having a radius of about 4.48 mm. Accordingly, if the starting radius for recording data is 6~9 mm, there will be no overlapping region of the ECC blocks in the radial direction, but the maximum error correction length is reduced to 3.63 mm, thereby substantially reducing the error correction capability.

To prevent the reduction of the error correction capability, an overlapping of the ECC blocks in the data recording region in a radial direction must be avoided, and to extend the maximum error correction length, data parity must be increased. However, an overall modification of the ECC format is not desirable.

Figure 2:
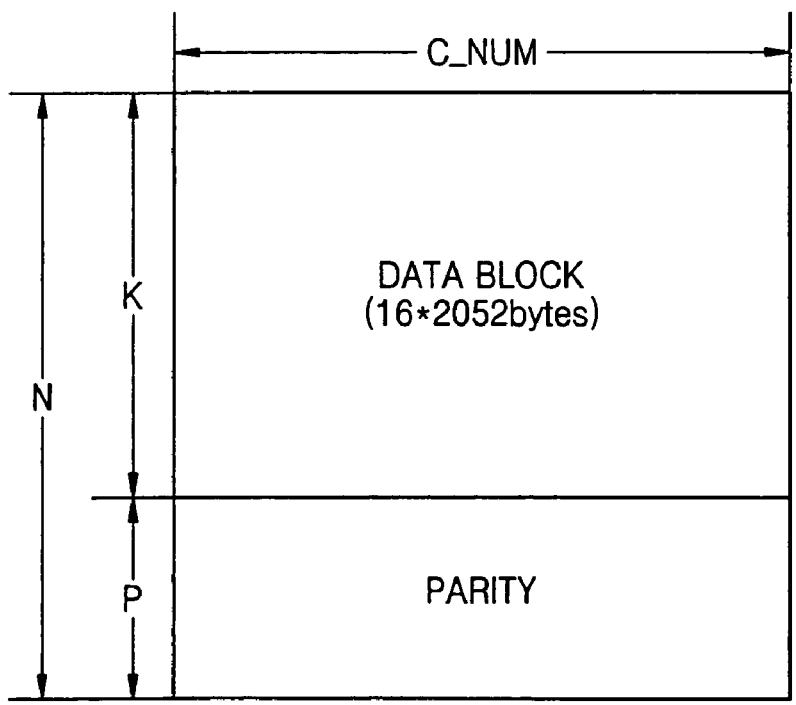
FIG. 2 is a format of an LDC block according to an embodiment of the present invention.

FIG. 2 is a format of an LDC block according to an embodiment of the present invention. Referring to FIG. 2, N represents the length of an RS code, K represents the user data length of the RS code, P represents the parity length of the RS code, and C_NUM represents the number of RS codes.

As described above, in the case where (N,K,PC_NUM) =(248, 216, 32, 152), or (N,K,P,C_NUM)=(124, 108, 16, 304), the C_NUM in the ECC format of U.S. Pat. No. 6,367,049 is reduced to half, or N, K, and P are reduced to 32 Kbytes. In this case, when the CBL is 0.060 μm the maximum error correction length is only 3.63 mm. Therefore, since it is likely that a reliability problem in data reproducing will appear, the data parity ratio needs to be appropriately increased to improve the error correction capability.

The ECC format of the present invention must meet the following conditions.

First, the size of an ECC block, which is the basic unit for recording and reproducing data, must be set in this instance to 32 Kbytes in order to prevent the ECC blocks from overlapping on two or more tracks in the radial direction. That is, since 4 bytes of error detection code (EDC) is added to each 2 Kbytes (2048 bytes)-long sector, the number of bytes in an LDC block excluding the parity is 32,832 bytes.

Second, the BIS must be considered. The BIS must be large enough to store the physical sector address and the control data.

Third, the ECC format must have the longest possible maximum error correction length.

Fourth, the storing capacity according to data efficiency must be considered.

Fifth, the total number of recording frames must be a multiple of 8 or 16 when forming the ECC block. In the case of a DVD, the ECC block contains 16 physical sectors and each physical sector has a data ID which allows quick access to the ECC block or physical sector when reproducing.

Sixth, considering the load on hardware of the error correction system of the RS code, preferably the number of the parity of the RS code is below 32, and the length of the RS code should be made as long as possible.

Regarding the first condition, since the ECC format comprises an LDC and a BIS, which is different from the RSPC structure of a DVD, the address information to access the physical sector is already stored in the BIS, as disclosed in U.S. Pat. No. 6,367,049. Since data to control user data can be stored in the control data, no additional data except user data and the EDC is necessary.

Regarding the second condition, a space for accessing the physical sector or storing control information for user data is required.

Regarding the third and fourth conditions, as the maximum error correction length increases, data efficiency decreases since a ratio of the user data is low, and thereby the overall media's storage capacity decreases. However, the storage capacity is more meaningful when the error correction capability of the ECC format is over a predetermined level. In other words, even though the storage capacity may be large, it is useless if the data is not reliable. After securing a sufficient level of error correction capability, the storage capacity of a medium can be meaningfully considered.

Regarding the fifth condition, preferably, though not necessarily, the physical sector is disposed regularly at an appropriate interval on the media. Since the host and the drives send and receive the user data in a size of 2 Kbytes, and considering the fact that one block has a size of 32 Kbytes, the number of recording frames within one ECC block needs to be a multiple of 16.

Regarding the sixth condition, the load on the hardware of the RS coded error correction system is determined by the parity number.

As the parity number increases, the number of errors that can be corrected in the codeword increases. However, the load on the hardware also increases by the same magnitude. It is desirable to have less than 32 parities in consideration of the conventional art. The capability of correcting errors increases as the codeword at the same parity ratio gets longer.

Figure 3:
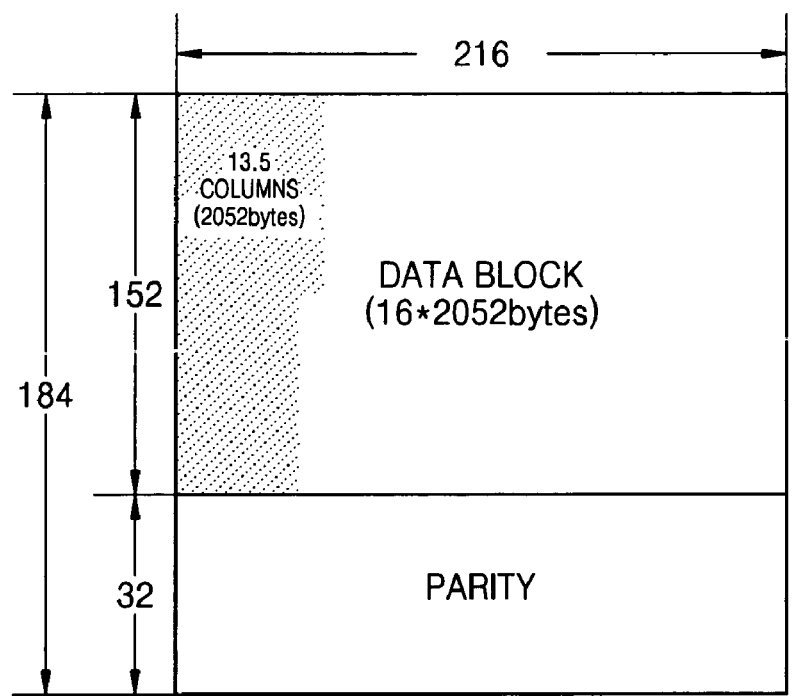
FIG. 3 is a format of an embodiment of a structure of the LDC block depicted in FIG. 2.

FIG. 3 is a format of a structure of the LDC block depicted in FIG. 2, according to an embodiment of the present invention.

Referring to FIG. 3, the structure of the LDC block is (184, 152, 32, 216). That is, N is 184, K is 152, P is 32, and C_NUM is 216. Therefore, the 32 Kbytes-sized error correction LDC block is comprised of 216 numbers of (184, 152, 32) LDCs.

Generally, since the size of a data unit for communicating between a host and a disc drive is 2 Kbytes (2048 bytes) per sector, the ECC format adds 4 bytes of error detection code (EDC) to the 2 Kbytes of user data. The disc drive, after reading data from the disc and correcting errors, adds 4 bytes of EDC when coding, to check whether the error correction has been accomplished. As shown in FIG. 3, the 2052 bytes, comprising 2 Kbytes of user data and 4 bytes of EDC, corresponds to 13.5 columns.

Figure 4:
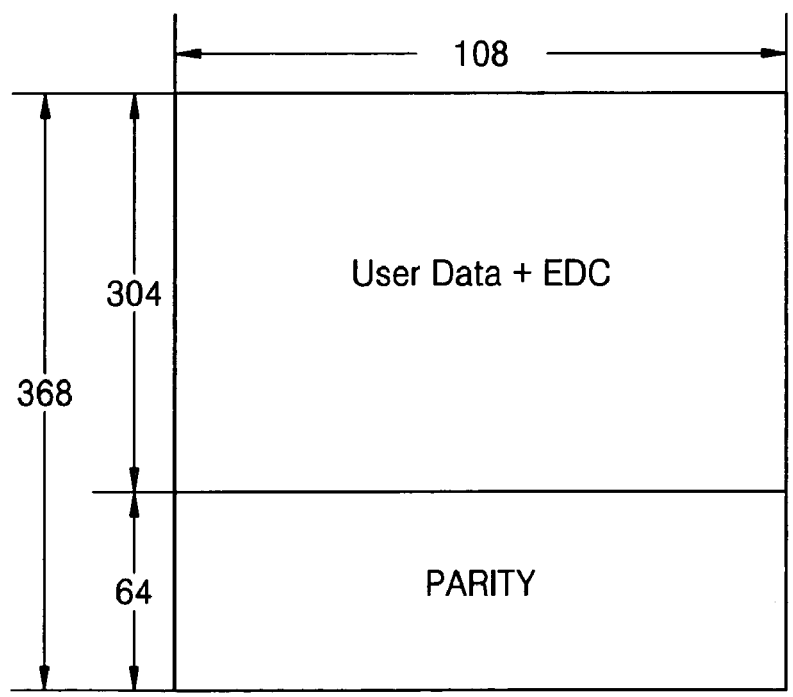
FIG. 4 is a format of an LDC block after interleaving the LDC block depicted in FIG. 3 with a predetermined method.

FIG. 4 is a format of an LDC block after interleaving the LDC block depicted in FIG. 3 with a predetermined method.

There are several methods of interleaving. FIG. 4 shows a block interleaving according to the methods described in FIGS. 10 and 12 in U.S. Pat. No. 6,367,049. The first method of interleaving described in FIG. 10 of the U.S. Pat. No. 6,367,049 is a method to insert byte information of odd numbered columns between byte information of even numbered columns. The second method of interleaving shown in FIG. 12 of the U.S. Pat. No. 6,367,049 is a method of shifting the row information in the row direction after the first interleaving. In the above U.S. patent, the shift value is 3, but the present embodiment may use a shift value of 1 or 7, which is relatively prime to 108, thereby maximizing a period.

Figure 5:
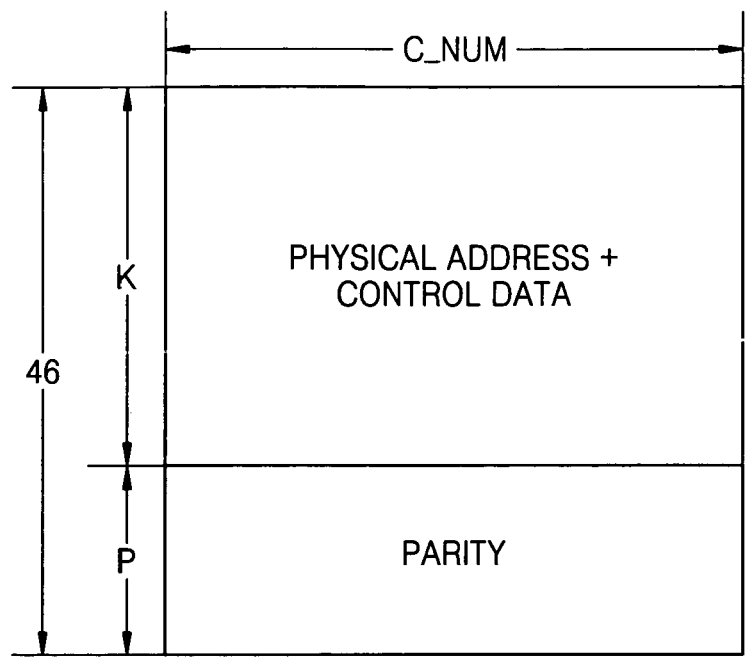
FIG. 5 is a format of a structure of a BIS block according to an embodiment of the present invention.

FIG. 5 is a format of a structure of a BIS block according to an embodiment of the present invention. The BIS block has a structure of (46, K, P, C_NUM), and the present embodiment is summarized in Table 2.

TABLE 2

| K | P | C_NUM | Physical Address | Control Data |
|---|---|---|---|---|
| 14 | 32 | 16 | 16 * 9 bytes | 16 * 5 bytes |
| 14 | 32 | 24 | 16 * 9 bytes | 16 * 12 bytes |

TABLE 2-continued

| K | P | C_NUM | Physical Address | Control Data |
|---|---|---|---|---|
| 22 | 24 | 16 | 16 * 9 bytes | 16 * 13 bytes |
| 22 | 24 | 24 | 16 * 9 bytes | 16 * 24 bytes |

Figure 6:
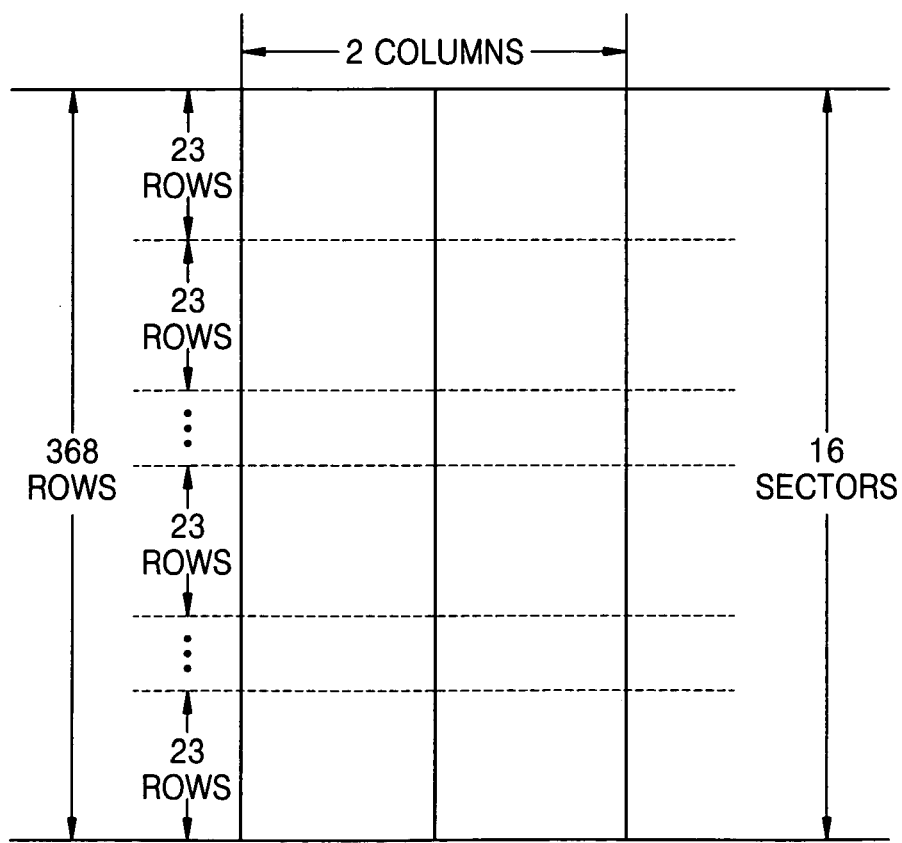
FIG. 6 is a format of the BIS depicted in FIG. 5 after interleaving.

FIG. 6 is a format of the BIS blocks of the first and third structure in Table 2 after interleaving according to a method of interleaving described in FIG. 14A of U.S. Pat. No. 6,367,049. In other words, since the C_NUM is 16, it can be divided into 8 parts by binding two codewords as shown in FIG. 5, and then interleaved according to the method of interleaving described in FIG. 14A of the U.S. Pat. No. 6,367,049. Though it is not shown in the drawing, the BIS blocks of the second and the fourth structure are performed in the same way as above, except that the number of rows is changed to 3 in FIG. 6.

Figure 7:
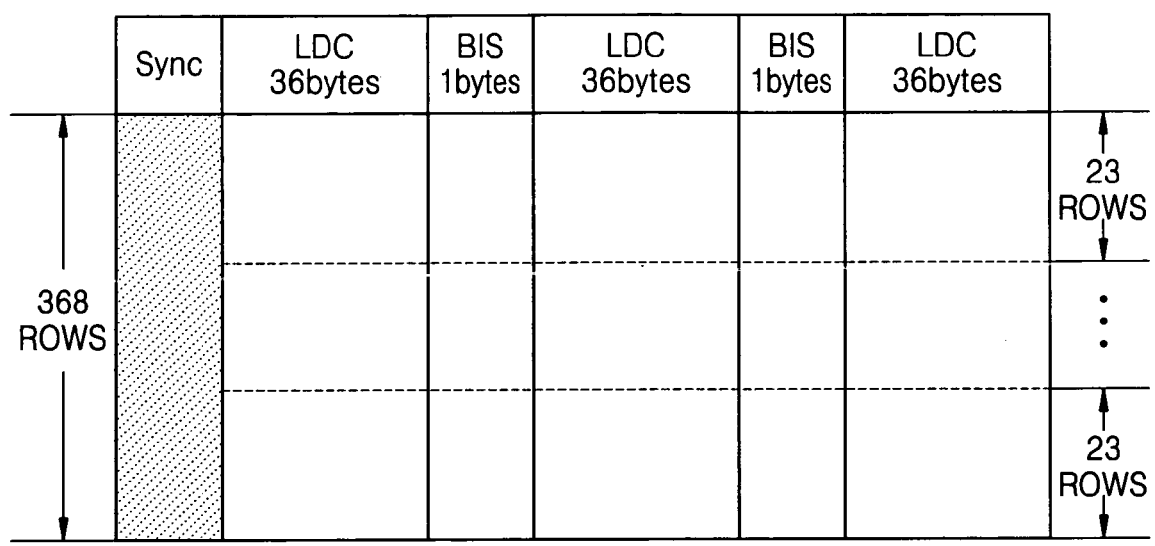
FIG. 7 is a format of an ECC block generated by combining the LDC block depicted in FIG. 4 and the BIS block depicted in FIG. 6 with a sync pattern.

FIG. 7 is a format of an ECC block created by combining the LDC block of FIG. 4 and the BIS block of FIG. 6 with a Sync Pattern.

Referring to the FIG. 7, the ECC block includes 368 Recording Frames. Each Recording Frame includes a Sync Pattern, 108 bytes of LDC, and 2 bytes of BIS. The ECC block includes 16 Physical Sectors, and 23 Recording Frames are recorded to each Physical Sector.

Each of the BIS bytes includes an address of the Physical Sector, thus 16 addresses of Physical Sector spaced apart at a predetermined distance are recorded to a single ECC block.

When the C_NUM of the BIS block in FIG. 5 is 24, then the number of rows in FIG. 6 is 3 and each row of the ECC block in FIG. 7 has a structure that 4 LDCs of 27 bytes and 3 BISs of 1 byte are inserted between LDCs of 27 bytes.

Heretofore, the LDC block having a structure of (184, 152, 32, 216) depicted in FIG. 3 has been described. Structures of the LDC block according to the present invention can further include structures such as (132, 108, 24, 304), (136, 108, 28, 304), or (140, 108, 32, 304).

When the structure of the LDC block is (132, 108, 24, 304), the structure has a BIS block of (33, 17, 16, 24), and can form an ECC block in which 264 Recording Frames are recorded to 8 Physical Sectors.

When the structure of the LDC block is (136, 108, 28, 304), the structure has a BIS block of (34, 18, 16, 24), and can form an ECC block in which 272 Recording Frames are recorded to 8 Physical Sectors.

When the structure of the LDC block is (140, 108, 32, 304), the structure has a BIS block of (35, 19, 16, 24), and can form an ECC block in which 280 Recording Frames are recorded to 8 Physical Sectors.

In a similar manner to the structures shown in Table 2, the (N, K, P, C_NUM) values of the BIS block in the above mentioned embodiments can also be modified, suitable to the number of Physical Sectors having a structure and a predetermined size of the Recording Frame in the ECC block, other than discussed in the above example values.

In the ECC block of FIG. 7, if a modulation code modulates the 8 bits of RLL (1,7) class to 12 bits, and the length of a Sync pattern length is 20 bits, the ECC block does not overlap in the radial direction after the recording radius of 6 mm when the CBL is smaller than 0.070 μm.

The maximum error correction length and the data efficiency of different embodiments of ECC blocks according to the present invention and the CBL of a conventional ECC block are summarized in Table 3.

TABLE 3

| | Number of BIS bytes in Recording Frame | Present Embodiments | | | | Conventional art |
| --- | --- | --- | --- | --- | --- | --- |
| | | first | second | third | fourth | |
| Maximum error correction length (CBL = 0.070 μm), | 2 3 | 6.01 mm 6.10 mm | 6.35 mm | 7.41 mm | 8.47 mm | 8.47 mm |
| Maximum error correction length (CBL = 0.060 μm), | 2 3 | 5.18 mm 5.23 mm | 5.44 mm | 6.35 mm | 7.28 mm | 7.28 mm |
| Data Efficiency (%) | 2 3 | 79.15 78.45 | 78.81 | 76.49 | 74.30 | 83.89 |

Referring to Table 3, as illustrated in FIG. 7, the first embodiment has an LDC block of (184, 152, 32, 216) and a BIS block of (46, 14, 32, 16), and is an ECC block in which 368 Recording Frames are recorded to 16 Physical sectors. The second embodiment has an LDC block of (132, 108, 24, 304) and a BIS block of (33, 17, 16, 24), and is an ECC block in which 264 Recording Frames are recorded to 8 Physical sectors. The third embodiment has an LDC block of (136, 108, 28, 304) and a BIS block of (34, 18, 16, 24), and is an ECC block in which 272 Recording Frames are recorded to 8 Physical sectors. The fourth embodiment has an LDC block of (140, 108, 32, 304) and a BIS block of (35, 19, 16, 24), and is an ECC block in which 280 Recording Frames are recorded to 8 Physical sectors. The conventional art refers to the ECC block of U.S. Pat. No. 6,367,049.

Assuming an erase correction is performed on a portion on which a scratch occurs, a Block Error Rate according to the conventional art and the Block Error Rate (BER) according to the present invention are shown in Tables 4 through 6. The BER is calculated according to the following equations 2 and 3.

$$CER = 1 - \sum_{i=0}^{(Parity-e)/2} \binom{N-e}{i}(1-P)^{N-e-i} P^i \quad \text{Equation 2}$$

$$BER = 1 - (1-CER)^{C\_NM} \quad \text{Equation 3}$$

where CER represents the codeword error rate, e represents the erase number, and p represents the byte error rate.

TABLE 4

| | Embodiment 1 | Embodiment 2 | Embodiment 3 | Conventional art |
| --- | --- | --- | --- | --- |
| Parity | 32 | 24 | 28 | 32 |
| p | 0.001 | 0.001 | 0.001 | 0.001 |
| e | 14 | 10 | 10 | 10 |
| N | 184 | 132 | 136 | 248 |
| C_NUM | 216 | 304 | 304 | 304 |
| BER | $7.9 * 10^{-13}$ | $2.6 * 10^{-10}$ | $5.3 * 10^{-14}$ | $1.3 * 10^{-14}$ |

Table 4 shows the BERs when a 2.268 mm scratch occurs in each case.

TABLE 5

| | Embodiment 1 | Embodiment 2 | Embodiment 3 | Conventional art |
| --- | --- | --- | --- | --- |
| Parity | 32 | 24 | 28 | 32 |
| p | 0.001 | 0.001 | 0.001 | 0.001 |
| e | 7 | 5 | 5 | 5 |
| N | 184 | 132 | 136 | 248 |
| C_NUM | 216 | 304 | 304 | 304 |
| BER | $3.2 * 10^{-18}$ | $5.7 * 10^{-14}$ | $8.6 * 10^{-18}$ | $4.8 * 10^{-18}$ |

Table 5 shows the BERs when a 1.134 mm scratch occurs in each case.

TABLE 6

| | Embodiment 1 | Embodiment 2 | Embodiment 3 | Conventional art |
| --- | --- | --- | --- | --- |
| Parity | 32 | 24 | 28 | 32 |
| p | 0.001 | 0.001 | 0.001 | 0.001 |
| e | 0 | 0 | 0 | 0 |
| N | 184 | 132 | 136 | 248 |
| C_NUM | 216 | 304 | 304 | 304 |
| BER | $1.3 * 10^{-9}$ | $3.2 * 10^{-7}$ | $3.4 * 10^{-9}$ | $2.8 * 10^{-7}$ |

Table 6 shows the BERs when no scratch occurs in each case.

The first through third embodiments and the conventional art in Tables 4 through 6 denote the first through third embodiments and the conventional art in Table 3, respectively.

When compared to the conventional art, in the case in which the CBL is 0.06 μm, the data efficiency and the error correction capability of the first and third embodiments are the most desirable.

Hereinafter, a data recording and/or reproducing apparatus according to the present invention will now be described.

Figure 8:
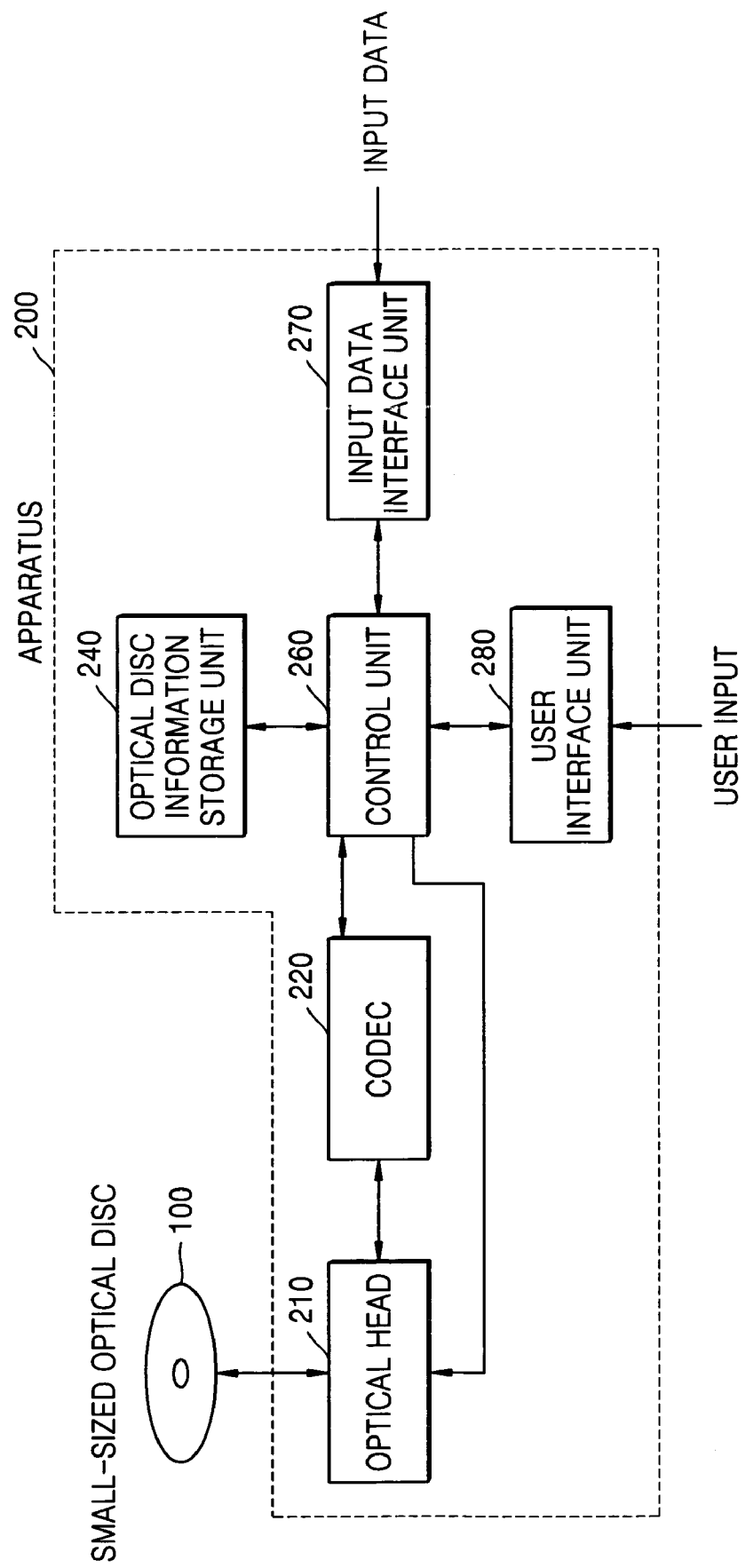
FIG. 8 is a block diagram of an apparatus to record and reproduce data according to an embodiment of the present invention.

FIG. 8 is a block diagram 200 of an apparatus to record and reproduce data according to an embodiment of the present invention.

Referring to FIG. 8, the apparatus 200 to record and/or reproduce data comprises an optical head 210, a codec 220, an optical disc information storage unit 240, a control unit 260, a data input interface unit 270, and a user interface unit 280.

The optical head 210 records data to a small-sized optical disc 100, or reads data recorded on the small-sized optical disc 100, in response to a control of the control unit 260. The small-sized optical disc 100 is an optical disc having a radius of an innermost circumference of 6 mm.

The codec 220 performs error correction coding according to embodiments of the present invention on the data to be recorded to the small-sized optical disc 100, or decodes the data read from the small-sized optical disc 100 in a reverse process of the coding.

The optical disc information storage unit 240 stores information relating to the small-sized optical disc 100.

The codec 220 generates LDC blocks by coding the user data according to the various ECC formats as shown in the first through fourth embodiments of the present invention. The codec 220 calculates the parity according to a predetermined method. The method of calculating the parity may be a conventional method, and therefore, a detailed description thereof will be omitted.

Also, the codec 220 generates a BIS block to indicate a location of an error when reproducing data, and generates an ECC block by disposing the LDC data and BIS data at a predetermined distance as depicted in FIG. 7. The codec 220 finally generates an ECC block to be recorded to a small-sized optical disc 100 and outputs to the optical head 210.

The optical disc information storage unit 240 stores information about the small-sized optical disc 100. The information includes a data region structure of the small-sized optical disc 100 or a data recording algorithm.

The control unit 260 controls the codec 220 and the optical head 210 to record data to the small-sized optical disc 100. Particularly, the control unit 260 controls the optical head 210 to record data outputted from the codec 220 to the small-sized optical disc 100 with a recording unit shorter than a length of a predetermined track of an inner circumference region of the small-sized optical disc 100.

The input data interface unit 270 transmits inputted data to be recorded to the small-sized optical disc 100 to the control unit 260.

The user interface unit 280 transmits a command to record data to the small-sized optical disc 100 inputted from a user to the control unit 260.

Referring to the structure of the data recording/reproducing apparatus 200 as described above, a method of recording data to the small-sized optical disc 100 according to an embodiment of the present invention will now be described.

Figure 9:
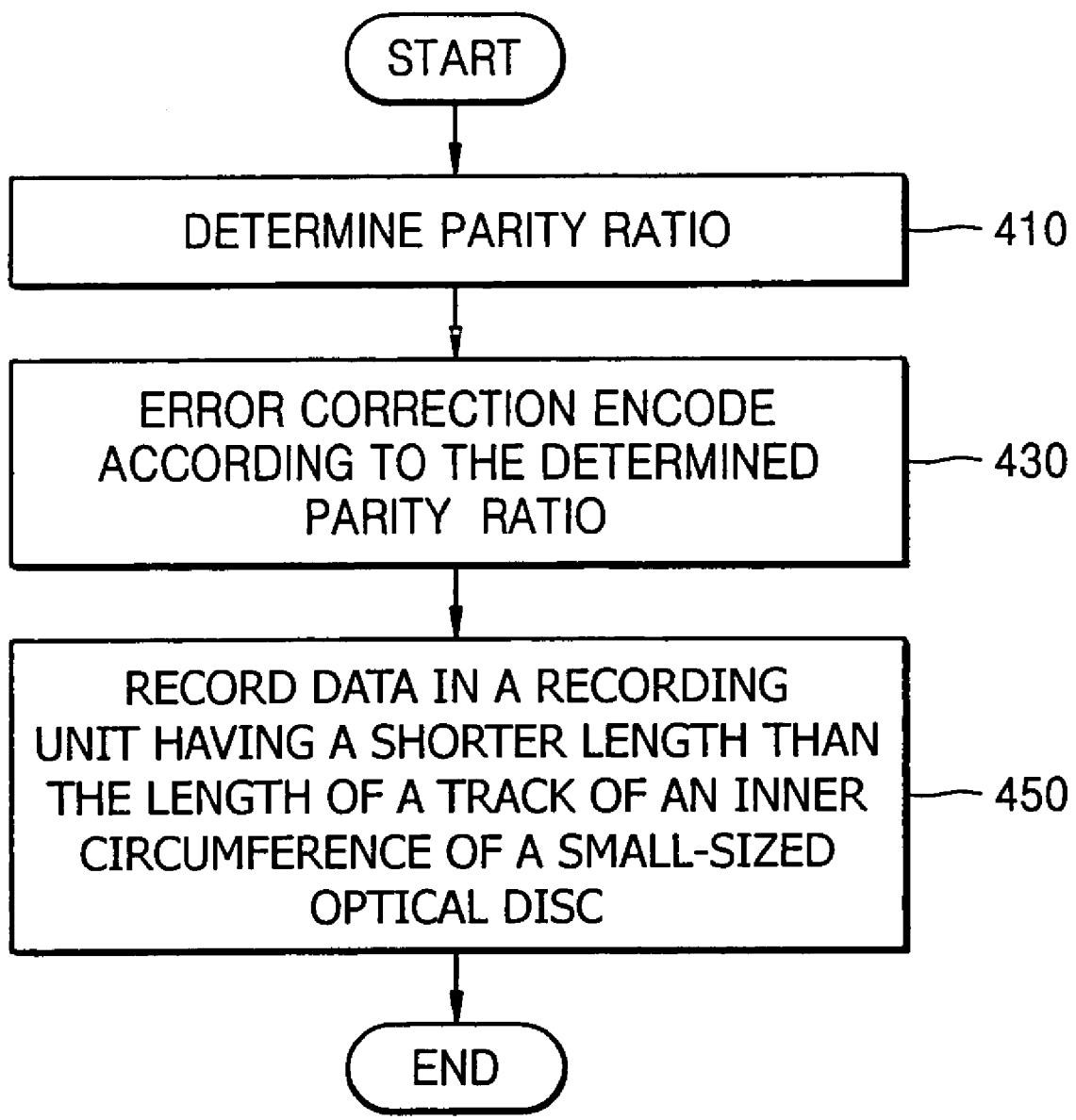
FIG. 9 is a flow chart illustrating a method of recording data according to an embodiment of the present invention.

FIG. 9 is a flow chart illustrating a method of recording data according to an embodiment of the present invention.

To record data to a small-sized optical disc 100, the size of the ECC block is reduced. However, in order to supplement the reduction of error correction capability due to the reduction of the ECC block size, a parity ratio of the Reed-Solomon code for error correction is determined (Operation 410). The parity ratio in the present embodiment of the present invention is improved to 32/184 by employing the LDC block having a structure of (184, 152, 32, 216). Information required for correcting errors, including the determined parity ratio, are recorded in the codec 220 in advance.

The codec 220 generates a plurality of codewords by error correction coding the predetermined amount of inputted data, such as 32 Kbytes of user data, according to the determined parity ratio of the Solomon code (Operation 430).

Even though it is not depicted in the flow chart, the codec 220 generates a BIS block for indicating a location of an error when reproducing data, and generates an ECC block by disposing the LDC data and BIS data at a predetermined distance as depicted in FIG. 7. The codec 220 finally outputs the ECC block to be recorded to a small-sized optical disc 100 to the optical head 210.

On the other hand, a variety of ECC formats other than the LDC block of (184, 152, 32, 216) may be formed as in the second through fourth embodiments of the present invention.

The optical head 210 receives data that includes a plurality of codewords from the codec 220, and records the data to a small-sized optical disc 100 in a recording unit having a shorter length than the length of a predetermined track of an inner circumference region of the small-sized optical disc 100 in response to the control of the control unit 260 (Operation 450).

The present invention can also be embodied as computer readable code on a computer readable recording medium. The computer readable recoding medium is any data storage device that can store data which can be thereafter read by a computer system. Examples of the computer readable recording medium include read-only memory (ROM), random access memory (RAM), CD-ROMs, magnetic tapes, floppy discs, optical data storage devices, and carrier waves. The computer readable recording medium can also be distributed over network coupled computer systems so that the computer readable code is stored and executed in a distributed fashion.

As described above, according to embodiments of the present invention, a method of error correction coding, a method of recording data, and an apparatus to record data, can prevent an ECC block from being recorded to more than two tracks of a small-sized optical disc, thereby improving error correction capability.

Also, a conventional hardware can be used without major modifications when increasing the parity ratio by reducing a length of the user data and maintaining the parity length of a conventional Reed-Solomon code.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of recording data, the method comprising:
    forming a plurality of codewords by error correction coding a predetermined amount of the data according to a predetermined method; and
    recording the data including the plurality of codewords to a small-sized optical disc in a recording unit of a shorter length than a predetermined track of an inner circumference region of the small-sized optical disc,
    wherein a parity ratio of the data is increased to supplement a reduction of error correction capability caused by the shorter length of the recording unit.

2. The method of claim 1, wherein the error correction coding is performed according to a Reed-Solomon coding method in which parity bytes P are added to input data bytes D.

3. The method of claim 2, wherein the forming of the plurality of codewords by error correction coding further comprises determining the parity ratio P/(D+P) to supplement the reduction of error correction capability caused by the shorter length of the recording unit.

4. The method of claim 3, wherein the forming of the plurality of codewords by error correction coding improves the parity ratio by reducing the input data bytes D and increasing the parity bytes P.

5. The method of claim 1, wherein the recording unit is an error correction coding (ECC) block of 32 Kbytes.

6. A data recording apparatus comprising:

an optical head;

a codec to generate a plurality of codewords by error correction coding a predetermined amount of inputted data according to a predetermined method; and a control unit to control the optical head to record data including the plurality of codewords in a recording unit of a shorter length than a predetermined track in an inner circumference region of the small-sized optical disc, wherein the codec performs error correction coding by increasing a parity ratio of the data to supplement a reduction of error correction capability caused by the shorter length of the recording unit.

7. The data recording apparatus of claim 6, wherein the codec performs error correction coding according to a Reed-Solomon coding method in which parity bytes P are added to input data bytes D.

8. The data recording apparatus of claim 7, wherein the codec performs error correction coding according to the parity ratio P/(D+P) to supplement the reduction of error correction capability caused by the shorter length of the recording unit.

9. The data recording apparatus of claim 8, wherein the parity ratio is determined by reducing the input data bytes D and increasing the parity bytes P.

10. A computer readable recording medium having recorded thereon a method of recording data to an optical disc, the method comprising:

generating a plurality of codewords by error correction coding a predetermined amount of the data according to a predetermined method; and recording the data including the plurality of codewords to a small-sized optical disc in a recording unit of a shorter length than a predetermined track of an inner circumference region of the small-sized optical disc, wherein a parity ratio of the data is increased to supplement a reduction of error correction capability caused by the shorter length of the recording unit.

11. A method of performing error correction coding on data, the method comprising:

generating a long distance code (LDC) block to record the data to a small-sized optical disc in a recording unit of a shorter length than a predetermined track of an inner circumference region of the small-sized optical disc, wherein a parity ratio of the data is increased to supplement a reduction of error correction capability cause by the shorter length of the recording unit;

generating a burst indication subcode (BIS) block to indicate a location of an occurred error group; and generating an error correction coding (ECC) block by combining a predetermined amount of BIS block data and the LDC block, wherein different portions of the BIS block are separated at a predetermined distance by one or more portions of the LDC block.

12. The method of claim 11, further comprising:

interleaving the generated LCD block; and interleaving the generated BIS block, wherein, the generating of the ECC block comprises combining the interleaved LCD and BIS blocks.

* * * * *